Sept. 4, 1951     D. MONTANO     2,566,496
FISHERMAN'S POLE REST
Filed May 20, 1949

INVENTOR.
DOMENICO MONTANO
BY
McMorrow, Berman & Davidson
Attorneys

Patented Sept. 4, 1951

2,566,496

UNITED STATES PATENT OFFICE 2,566,496

FISHERMAN'S POLE REST

Domenico Montano, Gloversville, N. Y.

Application May 20, 1949, Serial No. 94,430

6 Claims. (Cl. 248—42)

This invention relates to fishing rod supports, and more particularly to a fishing rod support device of the adjustable type.

A main object of the invention is to provide a novel and improved fishing-rod-supporting device which is simple in construction, easy to install on a boat, and which is readily adjustable in accordance with the size of the fishing rod to be supported therein, or the direction in which the fishing rod is required to be supported.

A further object of the invention is to provide an improved fishing-rod-support device adaptable either for use in a boat or for use in the ground, said support being inexpensive to manufacture, easy to adjust, and involving only a few parts.

Further objects and advantages of the invention will become apparent from the following description and claims, and from the accompanying drawings, wherein:

Figure 1:
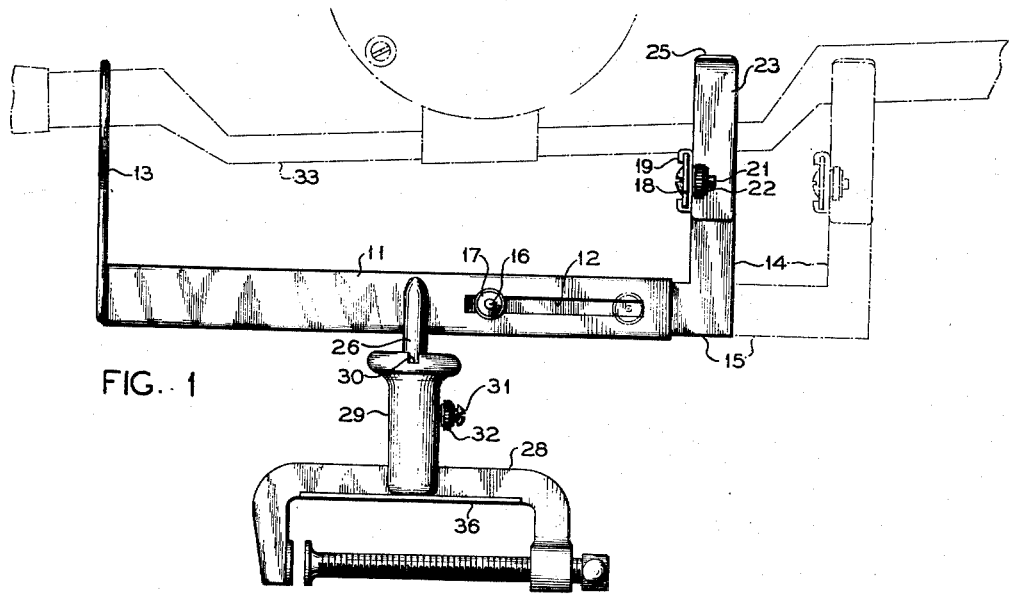
Figure 1 is a side elevational view of a fish-rod-support device constructed in accordance with the present invention, shown adapted for use in a boat.

Referring to the drawings, 11 designates an elongated flattened sleeve member formed adjacent its forward end with a longitudinal slot 12 and having secured to its rear end an upstanding wire hook 13, which constitutes a fixed rod engaging member. Designated at 14 is an upstanding bracket member having a horizontal leg 15 which is slidably received in sleeve member 11, the leg and sleeve forming telescopically arranged sections. Leg 15 is provided with a stud 16 extending through slot 12 on which is mounted a knurled thumb nut 17. Bracket member 14 may be secured in a desired extended position, as for example the position shown in dotted view in Figure 1, by means of the thumb nut 17.

Adjustable rod engaging means is disposed cooperative to the hook 13 and includes an arm 18, formed on the upper portion of the bracket member 14 and projecting at right angles to the plane of the bracket member and on which is slidably mounted a flattened sleeve member 19. Sleeve member 19 is formed with an elongated slot 20. Arm 18 is provided with a stud 21 projecting through slot 20 on which is mounted a knurled nut 22. Sleeve member 19 is formed at its inner end with a vertical arm 23 extending parallel to the body of bracket member 14. The upper portions of bracket member 14 and arm 23 define resilient opposing fingers and are outwardly bent at their top ends, as shown at 24 and 25, to facilitate the entry of a fishing pole therebetween. Arm 23 may be secured in a desired spaced relation to bracket member 14 by means of the thumb nut 22.

Integrally secured to the intermediate portion of sleeve member 11 is a depending rod member 26 having secured therein a transverse pin member 27. Designated at 28 is a clamp carrying an upstanding socket member 29 in which rod member 26 is receivable. The top of socket member 29 is formed with four radial grooves 30 spaced 90° apart, allowing the transverse pin member 27 to be seated therein, whereby sleeve member 11 may be supported in socket member 29 in four different positions of angular adjustment around the axis of the socket member. The socket member is provided with a set screw 31 having mounted thereon a knurled lock nut 32. Set screw 31 is engageable with the rod member 26 to lock same in the socket member 29. The lock nut 32 may be employed to lock set screw 31 in a tightened position.

Figures 2, 3:
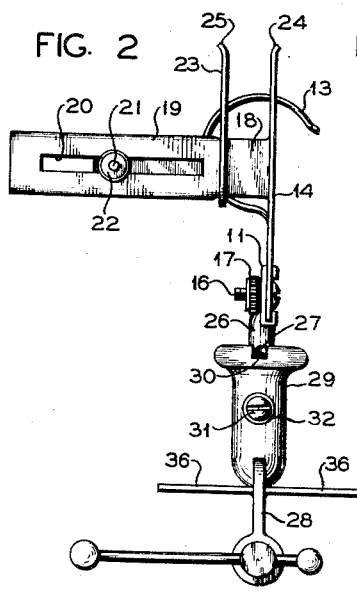
Figure 2 is a front elevational view of the fishing-rod-support device of Figure 1.
Figure 3 is a view partly in cross-section similar to Figure 2, and showing the support device adapted for use in the ground.

In using the device of Figures 1 and 2, the clamp 28 is engaged with an upstanding portion of a boat, such as the side or end wall of the boat. The fishing rod shown in dotted view at 33 is then supported between the aforementioned resilient fingers defined by bracket member 14 and arm 23 in the manner shown in Figure 1, the rear portion of the rod being engaged beneath the hook member 13, whereby the weight of the forward portion of the rod, the fishing line, and the load imposed on the line by a fish are supported by said hook member.

Figure 5:
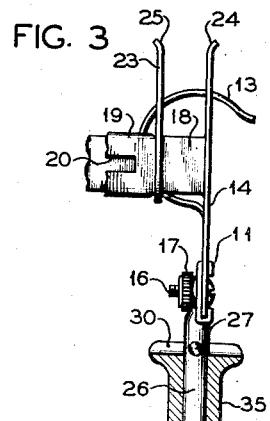
Figure 5 is a cross-sectional view taken on line 5—5 of Figure 4.
Figure 4:
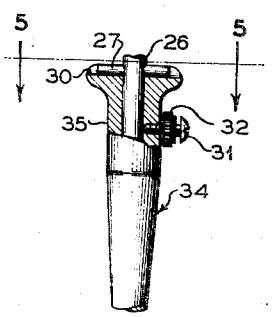
Figure 4 is a fragmentary detail view of the ground-engaging member of Figure 3, part of said member being shown in cross-section.

When the device is to be employed for shore fishing, the pointed stake member 34, shown in Figures 3 to 5, is used in place of the clamp device 28. The stake member 34 is formed with an upper socket portion 35 in which the rod element is receivable. The top of socket portion 35 is formed with the radial grooves 30 similar to those of socket member 29. Socket portion 35 is also provided with a set screw 31 engageable with rod element 26 to lock said rod element in the socket portion, said screw being provided with a knurled lock nut 32. The stake member 34 is driven into the ground and provides a stationary support for the remainder of the fishing rod holder. The fishing rod is positioned in the holder in the same manner as illustrated in Figure 1.

The clamp device 28 of Figures 1 and 2 is provided with horizontal bearing wings 36, 36 at its upper arm, preventing the clamp device from being rocked laterally when secured to the wall of a boat.

It will be noted that the holder is readily adjustable, by means of the nuts 17 and 22, to receive various sizes and shapes of fishing rods, and that the rod may be positively supported in any one of four different angular positions around the axis of the socket portion of the holder by the cooperation of the transverse pin member 27 with the radial grooves 30.

While a specific embodiment of an adjustable support device for fishing rods has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing rod holder comprising a support formed with a vertical socket portion, a horizontal sleeve member having a depending rod element receivable in said socket portion, an upstanding hook carried by said sleeve member, a bracket having an arm slidably received in said sleeve member and mounting said bracket parallel to said hook, said bracket being provided with resilient fingers adjustable relative to each other, means for locking said fingers in adjusted positions, and means for locking said arm in adjusted position in said sleeve member.

2. A fishing rod holder comprising a support formed with a vertical socket portion, a first horizontal sleeve member having a depending rod element receivable in said socket portion, an upstanding hook carried at one end portion of said first sleeve member, an upstanding bracket having a first horizontal arm portion slidably received in said first sleeve member, said bracket being provided at its upper portion with spaced resilient fingers, one finger having a horizontal sleeve portion and the other finger having a horizontal arm slidably receivable in said horizontal sleeve portion, means for locking the arm in adjusted position in said sleeve portion, and means for locking said first horizontal arm portion in adjusted position in said first sleeve member.

3. A fishing rod holder comprising a support formed with a vertical socket portion, a first horizontal sleeve member having a depending rod element receivable in said socket portion, said rod element being provided with a transverse pin extending radially therefrom on opposite sides and the socket portion having radial grooves formed at its top and in which the transverse pin is receivable, means releasably locking the rod element in the socket portion, an upstanding hook carried at one end portion of said first sleeve member, an upstanding bracket having a first horizontal arm portion slidably received in said first sleeve member, said bracket being provided at its upper portion with spaced resilient fingers, one finger having a horizontal sleeve portion and the other finger having a horizontal arm slidably receivable in said horizontal sleeve portion, means for locking the arm in adjusted position in said sleeve portion, and means for locking said first horizontal arm portion in adjusted position in said first sleeve member.

4. A fishing rod holder comprising a support adapted to be mounted in a vertical position, said support having a vertically formed socket, a sleeve having a depending rod receivable in said socket for supporting said sleeve in a horizontal position, a fixed upstanding rod engaging means on said sleeve, movable upstanding rod engaging means carried by said sleeve and longitudinally adjustable relative thereto, said last means being disposed parallel to the fixed rod engaging means and including a pair of members adjustable relative to each other and transversely to the plane of the sleeve.

5. A fishing rod holder comprising a socket member, means for mounting said socket member in a vertical position, a pair of telescopically arranged sections, means carried by one of said sections receivable in said socket member for mounting the sections in a horizontal plane, a fixed rod engaging member formed upright on one section, upstanding adjustable rod engaging means carried by the other section and disposed parallel to the fixed member, said last means including a pair of upstanding fingers, one of said fingers being fixedly carried by the section and the other being adjustable relative to the fixed finger and transversely of the plane of the sections, and means for locking said fingers in adjusted position.

6. A fishing rod holder comprising a socket member, means for mounting said socket member in a vertical position, a pair of telescopically arranged sections, means carried by one of said sections receivable in said socket member for mounting the sections in a horizontal plane, a fixed rod engaging member formed upright on one section, upstanding adjustable rod engaging means carried by the other section and disposed parallel to the fixed member, said last means including a pair of upstanding fingers, one of said fingers being fixedly carried by the section and the other being adjustable relative to the fixed finger and transversely of the plane of the sections, said fixed finger having a lateral arm and the movable finger having a lateral member sleeved on the arm, and means for locking said member and arm in adjusted position.

DOMENICO MONTANO.

REFERENCES CITED

The following references are of record in the file of this patent:

UNITED STATES PATENTS

| Number | Name | Date |
|---|---|---|
| 1,876,478 | Van Duzer | Sept. 6, 1932 |
| 1,891,163 | Kabele | Dec. 13, 1932 |
| 2,454,458 | Kaetker | Nov. 23, 1948 |
| 2,459,549 | Smith | Jan. 18, 1949 |